United States Patent [19]
Kennedy

[11] Patent Number: 4,597,148
[45] Date of Patent: Jul. 1, 1986

[54] TOOL FOR REMOVING FRAME CLIPS

[76] Inventor: Dori-Jayne Kennedy, 21 Meleca Ave., Pittsfield, Mass. 01201

[21] Appl. No.: 690,740

[22] Filed: Jan. 11, 1985

[51] Int. Cl.[4] .............................................. B23P 19/04

[52] U.S. Cl. ........................................ 29/230; 29/270; 29/278

[58] Field of Search ................. 29/225, 230, 235, 270, 29/278

[56] References Cited

U.S. PATENT DOCUMENTS

| | | | |
|---|---|---|---|
| D. 55,792 | 7/1920 | Hudgins | 29/270 |
| 662,955 | 12/1900 | McClelland | 29/270 |
| 2,898,674 | 8/1959 | Anderson | 29/278 |
| 2,999,310 | 9/1961 | Pope | 29/270 |
| 3,751,785 | 8/1973 | Whitesell . | |
| 4,244,094 | 1/1981 | Rucinski | 29/270 |
| 4,306,323 | 12/1981 | Poore . | |

*Primary Examiner*—James L. Jones, Jr.
*Attorney, Agent, or Firm*—Sidney Greenberg

[57] ABSTRACT

Tool for removing spring clips from a picture frame, in which the clips are arranged between the backing sheet and the channel-shaped frame. The tool comprises an elongated handle from which a shank extends at an angle of about 45°, the shank having at its outer end a blade projecting laterally from the shank at opposite sides. At one side the blade is formed with a pair of spaced projections for engaging the spring clip for pulling it out. At the opposite side the blade is similarly formed with a pair of projections which are spaced closer together than the other pair of projections.

6 Claims, 3 Drawing Figures

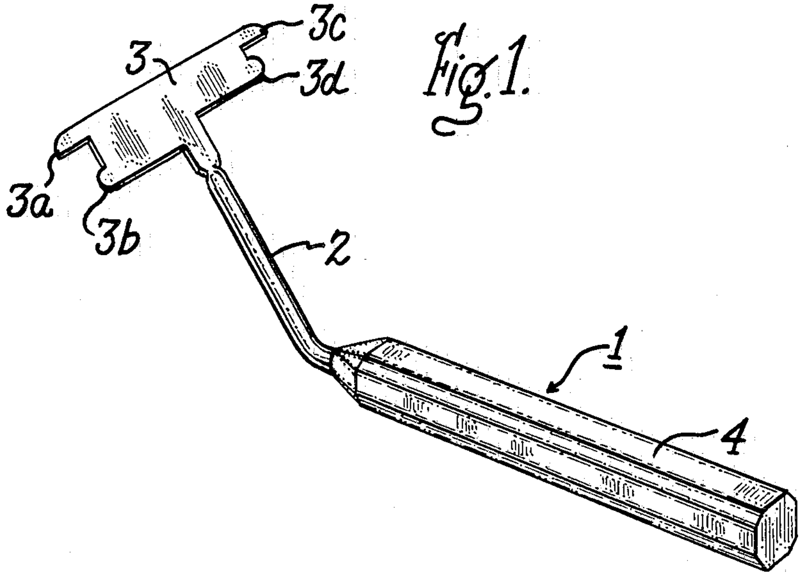
Fig. 1.
Fig. 2.
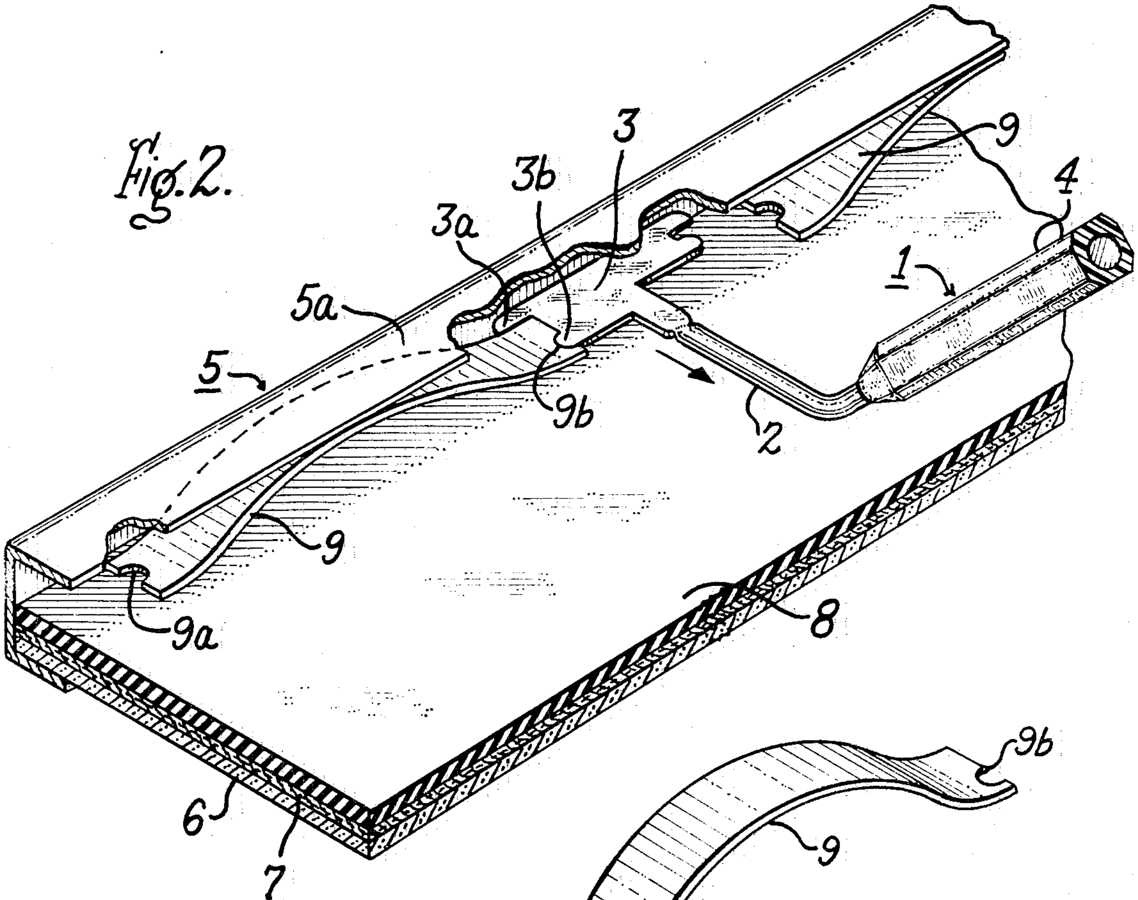
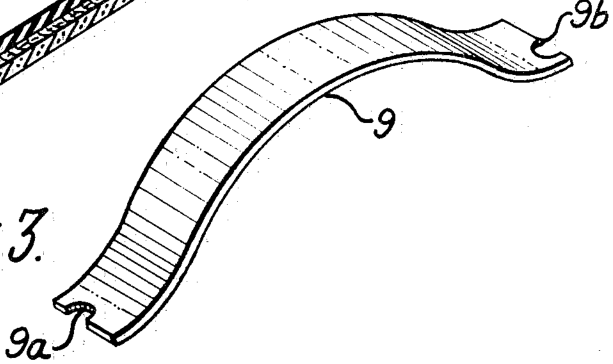
Fig. 3.

TOOL FOR REMOVING FRAME CLIPS

The present invention relates to a hand tool, and more particularly concerns a tool for removing spring clips from a picture frame.

It is an object of the invention to provide an improved hand tool to facilitate removal of spring clips, particularly of bowed compressible type, from a picture frame or the like.

It is a particular object of the invention to provide a tool of the above type which is readily inserted into a channel-shaped frame and firmly engages the spring clips positioned therein for removal of the clips.

Another object of the invention is to provide a tool of the above type which is simple in design, inexpensive to produce, and easily and quickly removes the clips without damage to the frame or the framed material.

Other objects and advantages will become apparent from the following description and the appended claims.

With the above objects in view, the present invention in one of its aspects relates to a tool for removing spring clips from a picture frame or the like wherein the spring clips are formed of a bowed compressible strip member arranged in the space between the frame and the framed material, and wherein the strip member has a recess in the end thereof, said tool comprising an elongated handle, a shank portion extending from the end of said handle, said shank portion having at its outer end a blade portion projecting laterally therefrom, said blade portion formed with a first lateral projection at its outer end and a second lateral projection spaced inwardly from said first projection and formed to fit within the recess in the spring clip, whereby said blade portion may be inserted in the space between the frame and the framed material for firmly engaging the end of the clip for removing the clip from the frame.

The invention will be better understood from the following description taken in conjunction with the accompanying drawing, in which:

FIG. 1 is a perspective view of a frame tool constructed in accordance with the invention;

FIG. 2 is a perspective view of a portion of a frame assembly including a spring clip in operative position therein and showing the arrangement of the frame tool relative to the assembly prior to removal of the clip therefrom; and FIG. 3 is a perspective view of a bowed compressible spring clip such as shown in the FIG. 2 assembly.

Referring now to the drawing, and particularly to FIG. 1, the illustrated embodiment of the invention comprises a frame tool 1 having an elongated handle 4 such as metal having a metal rod or shank 2 extending from one end of handle 4 at an angle of about 45° thereto. At its outer end shank 2 is formed with a flat blade portion 3 extending laterally on opposite sides of the shank, the opposite blade portions being typically of different widths, i.e., longitudinally of the shank, as shown. On one side, the blade portion has a pair of spaced lateral projections 3*a* and 3*b*, and on its opposite side a similar pair of lateral projections 3*c* and 3*d* spaced closer together than the other pair. Typically the outer projections 3*a*, 3*c* are somewhat longer than the inner projections 3*b*, 3*d*.

In accordance with the invention, the described lateral projections are designed to firmly engage the end of compressible bowed spring clips of known type, which are conventionally employed to hold pictures or the like in a frame, in order to readily remove the clips from the frame assembly. Such a frame assembly is shown in fragmentary form in FIG. 2, wherein a channel-shaped metal frame 5 has inserted therein an assembly of frame material comprising glass panel 6, picture 7 or the like, and back sheet 8 such as cardboard or the like, the thus superposed assembly of framed material being held within the frame 5 by a number of bowed compressible spring clips 9 inserted in the space between the rear wall 5*a* of the frame and backing sheet 8 and holding the assembly of framed material in compression, all as conventional in the art.

As shown more clearly in FIG. 3, spring clip 9 as received from the supplier is typically formed with recesses 9*a*, 9*b* at the opposite end edges of the clip for the purpose of enabling removal of the clip, which is compressed in the frame, by means of a screwdriver or similar tool. However, such conventional tools have been found to be generally unreliable and difficult to use for removal of the clips.

By virtue of the present tool, such removal is readily and effectively made by simply inserting blade portion 3 into the frame 5 (see FIG. 2) at the end of clip 9 so that the outer projection 3*a* engages the far side edge of the clip while projection 3*b* fits into recess 9*b* at the end of the clip, and pulling the tool outwardly to thereby dislodge and remove the clip from the frame. As will be evident, the arrangement of the tool shank 2 at an angle to handle 4 as shown and described allows the handle to be readily grasped and manipulated to properly insert blade portion 3 in the narrow space between frame 5 and backing sheet 8 and into engagement with the end of clip 9, and to thereafter be pulled away from the frame to withdraw blade portion 3 in engagement with the clip to fully remove it. In this way, the several clips spaced around the frame may be rapidly removed in sequence by the described tool, to thereby enable disassembly of the framed components.

The spacing provided between projections 3*a* and 3*b* of the blade portion corresponds to the distance between the side edge of the clip and the recess in its end edge such as characterizes clips generally supplied in the market. However, to accommodate some clips which may have the end recess closer to its side edge than in other clips, the projections 3*c*, 3*d* formed at the opposite side of blade portion 3 are correspondingly spaced closer together to properly engage the end of such clips, it being understood that in such case, tool 1 would be inserted at the end of clip 9 opposite to that shown in FIG. 2.

In a typical tool of the described construction for removing spring clips about ⅜" wide, flat blade portion 3 projects laterally about ½" (not counting the lengths of projections 3*a*, 3*b*) and is about 1/16" thick, its overall width at the wider side (measured longitudinally of the shank) is about ⅜", the spacing between projections 3*a*, 3*b* being about 3/16" at their bases, the corresponding width of blade portion 3 at the opposite narrower side is about ¼", the length of projection 3*a* is about 3/16" and rounded projection 3*b* has a radius of about 1/16". While in a usual case the angle between shank 2 and handle 4 is about 45°, this angle may vary widely for practical purposes, e.g., between 30° and 60°.

There is thus provided by the invention a novel and simple hand tool which enables the user to quickly and effectively remove spring clips from a frame of the type described in order to readily disassemble the framed assembly.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A tool for removing spring clips from a frame wherein the spring clips are formed of a bowed compressible strip member arranged in the space between the frame and the framed material, and wherein the strip member has a recess in the end edge thereof, said tool comprising an elongated handle, a shank portion extending from said handle, said shank portion having at its outer end a flat blade portion projecting in a plane laterally therefrom, said blade portion formed with a first lateral projection at its outer end and a second lateral projection spaced inwardly from said first projection and formed to fit within the recess in the spring clip, said projections extending in said plane, whereby said blade portion may be inserted in the space between the frame and the framed material for firmly engaging the end of the clip for removing the clip from the frame.

2. A tool as defined in claim 1, said shank portion extending from the end of said handle substantially in said plane at an angle of about 30°–60° to said handle.

3. A tool as defined in claim 2, said angle being about 45°.

4. A tool as defined in claim 1, said first lateral projection being longer than said second lateral projection.

5. A tool for removing spring clips from a frame wherein the spring clips are formed of a bowed compressible strip member arranged in the space between the frame and the framed material, and wherein the strip member has a recess in the end edge thereof, said tool comprising an elongated handle, a shank portion extending from said handle, said shank portion having at its outer end a blade portion projecting laterally therefrom, said blade portion formed with a first lateral projection at its outer end and a second lateral projection spaced inwardly from said first projection and formed to fit within the recess in the spring clip, whereby said blade portion may be inserted in the space between the frame and the framed material for firmly engaging the end of the clip for removing the clip from the frame, said shank portion extending from the end of said handle in a plane at an angle of about 30°–60° to said handle, said blade portion projecting laterally from said shank portion in said plane, said blade portion extending in said plane on opposite sides of said shank portion and having laterally projecting pairs of spaced projections on opposite sides.

6. A tool as defined in claim 5, the spacing between the projections in the respective pairs being different.

* * * * *